United States Patent [19]

Restelli

[11] 4,346,777
[45] Aug. 31, 1982

[54] MOTOR UNIT FOR BICYCLES

[75] Inventor: Amedeo A. Restelli, Cernusco Lombardone, Italy

[73] Assignee: Societa Italiana Catene Calibrate Regina S.p.A., Italy

[21] Appl. No.: 129,762

[22] Filed: Mar. 12, 1979

[30] Foreign Application Priority Data

Mar. 12, 1979 [IT] Italy .................. 21055/79[U]

[51] Int. Cl.³ .............................................. B62M 7/12
[52] U.S. Cl. ................................. 180/220; 180/65 F
[58] Field of Search ................. 180/220, 214, 65 F

[56] References Cited

U.S. PATENT DOCUMENTS 572,036  11/1896  Theryc ........................ 180/220 X

FOREIGN PATENT DOCUMENTS

| 2743649 | 4/1978 | Fed. Rep. of Germany .... 180/65 F |
| 746976 | 6/1933 | France ........................ 180/65 F |
| 1021263 | 2/1953 | France ........................ 180/220 |
| 199361 | 8/1938 | Switzerland .................. 180/220 |
| 257924 | 4/1949 | Switzerland .................. 180/220 |
| 5870 | of 1911 | United Kingdom ............. 180/214 |

Primary Examiner—John A. Pekar
Attorney, Agent, or Firm—Karl W. Flocks

[57] ABSTRACT

A motor unit for bicycles, characterized by the fact that it comprises a central axle for fitting to the fork of a bicycle, on which axle is rotatably supported a substantially cylindrical body adapted to form the hub of a wheel, there being fitted within said body and to the central axle the stator of a discoid rotor electric motor connected to the body by a kinematic transmission.

1 Claim, 2 Drawing Figures

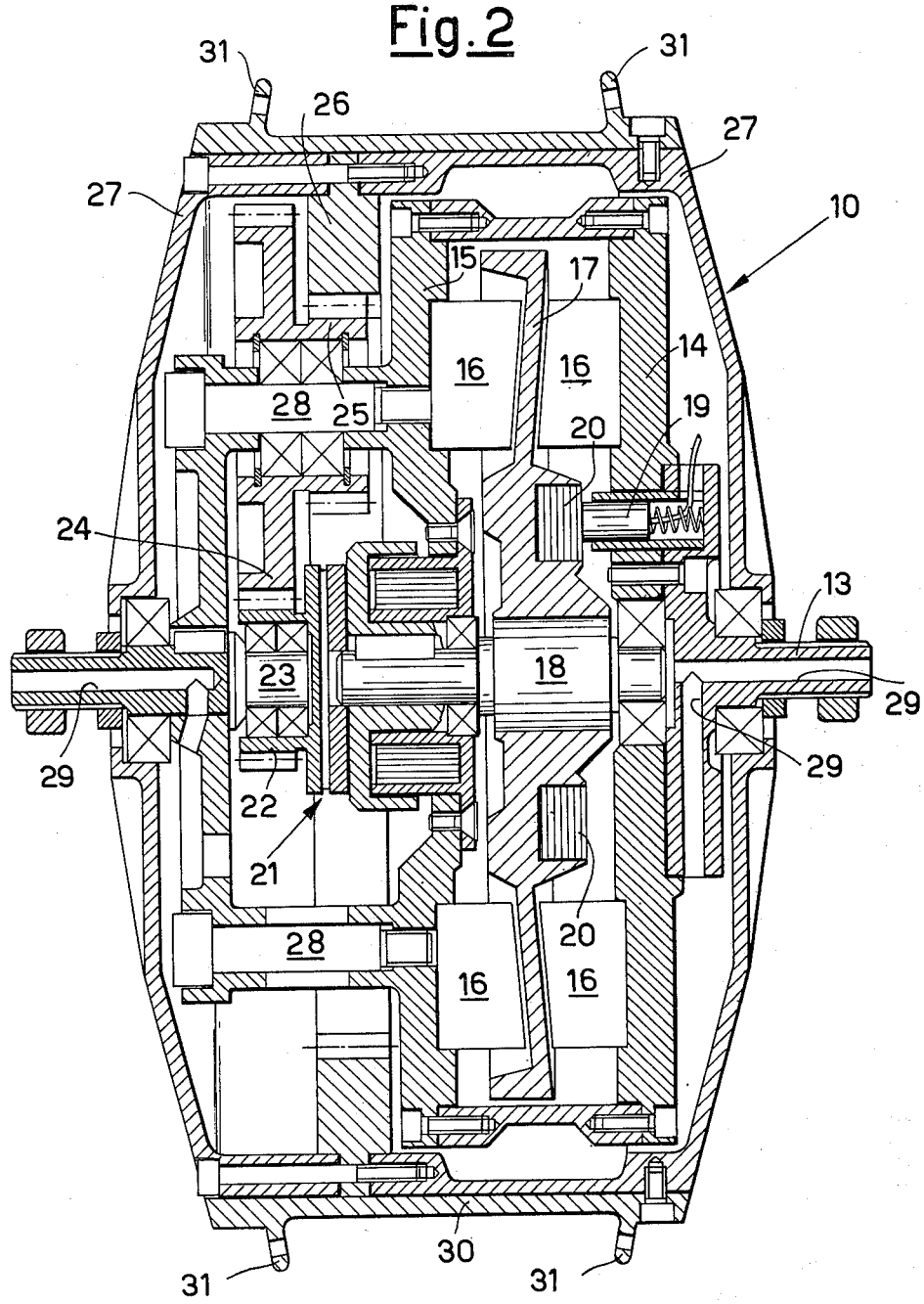

MOTOR UNIT FOR BICYCLES

BACKGROUND OF THE INVENTION

Interest in the problem of motorizing bicycles has existed for decades, and is well known one of the difficulties of such motorization is, in particular, the limiting of the weight and bulk of the motor and of its kinematic connections to the wheel.

SUMMARY OF THE INVENTION

The present invention therefore proposes a motor configuration particularly adapted to allow the motor to be fitted at the centre of a bicycle wheel, as for example the front wheel.

According to the invention the motor unit comprises a central axle for fitting to the fork of a bicycle, on which axle there is supported in a rotatable manner a substantially cylindrical body adapted to form the hub of a wheel, there being fitted within said body and to the central axle the stator of a discoid rotor electric motor connected to the body by a kinematic transmission.

BRIEF DESCRIPTION OF THE DRAWINGS

For a better comprehension of the objects and characteristics of the motor unit according to the invention there is described below an exemplifying form of execution of the motor unit as illustrated in the attached drawing, in which:

FIG. 2 is a sectional view in direction of line 2—2 of FIG. 1.

DETAILED DESCRIPTION OF THE INVENTION

Figure 1:
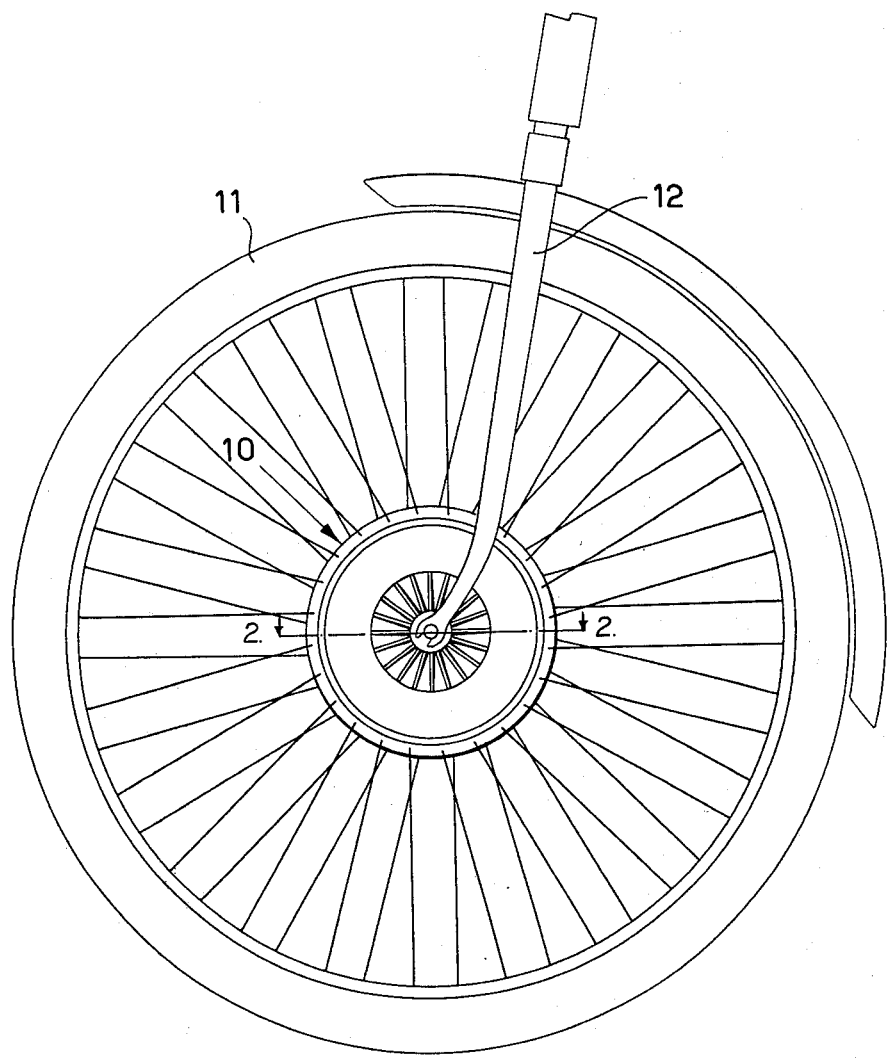
FIG. 1 is a general view of a motor unit fitted to a bicycle wheel.

As shown in FIG. 1, the motor group according to the invention, generically indicated by 10, is adapted in practice to form the central hub of a wheel 11 supported by the usual front fork 12 of a bicycle in itself conventional.

As is more clearly illustrated in FIG. 2, the motor unit 10 comprises a pin or central axle 13 fixed to the stator of a motor comprising two discoid portions 14 and 15 on which are mounted permanent magnets 16 between which is housed the rotor 17 carried by the pin 18.

The motor is complete with the usual components, such as the brushes 19 which operate on the frontal commutator 20.

This motor is in itself of known type in which the rotor consists of disk made of resin in which the windings are buried, the whole being considerably compact as regards axial thickness.

By means of an electromagnetic clutch 21, the pin 18 is connected to the pinion 22 rotating on the pin 23. The pinion 22 engages the gear 24 which is solid or rigid with gear 25 which in its turn is in engagement with the internally toothed annulus 26 supported by a generically cylindrical body 27 rotatably supported on one side by the said pin 13 and on the other side by a prolongation of the pin 23. The gears 24 and 25 are supported by a fixed pin 28.

Both the pin 13 and the pin 23 (or one of them only) have through-bores 29 for the passage of the electric feeder cables for the motor and the electromagnetic clutch.

on the body 27 is fitted a skirting 30 with lugs 31 for the spokes of the wheel 11.

An examination of the aforesaid structure evidences the manner of operation and the advantages of the invention.

The entire motor unit is highly compact and does not substantially alter the behaviour of the bicycle when driven by pedals, i.e. without the aid of the motor. The disengagement of the clutch 21 greatly limits the friction forces of the motor unit, obviating the rotation of the rotor 17 when the motor is not fed.

A feed supply to the motor and the engagement of the clutch 21 allows the bicycle to travel at an adequate speed, at the same time allowing the rider the possibility of using the pedals to aid the motor when necessary, for example when starting-off or going uphill.

This possibility of ready intervention on the part of the rider when more power is required means that the power of the motor installed can be limited, in the interests of low motor weight and easy motor installation.

Various formal variants can of course be made to what has been described above by way of example only.

For instance, provision can be made for two kinematic transmissions between rotor and outer body of the motor group: each with a different transmission ratio and with its own electromagnetic clutch, thus providing two gearspeeds so as to adapt the motor unit to different types of run.

I claim:

1. A motorized wheel for a bicycle comprising in combination:
  a. a hollow substantially symmetrical and substantially cylindrical hub body rotatably supported on a central axle adapted to be fixedly mounted on a fork of a bicycle;
  b. a stator including discoid portion fixed to said central axle within said hub body;
  c. a discoid rotor rotatably supported between said discoid portions within said hub body;
  d. a kinematic transmission including a plurality of gears rotatably mounted within said hub body and a driven member fixed to said hub body and in driving engagement with one of said gears;
  e. said transmission including an electromagnetic clutch which connects said discoid rotor through said plurality of gears and said driven member to said hub body to move said hub body in rotation;
  f. spokes connected between said hub body and a wheel rim to rotate said wheel rim with rotation of said hub body.

* * * * *

UNITED STATES PATENT AND TRADEMARK OFFICE
CERTIFICATE OF CORRECTION

PATENT NO. : 4,346,777
DATED : August 31, 1982
INVENTOR(S) : Amedeo ANCARANI RESTELLI It is certified that error appears in the above—identified patent and that said Letters Patent is hereby corrected as shown below:

Title Page [75] Inventor should read as follows:

[75] Inventor: Amedeo ANCARANI RESTELLI, Cernusco Lombardone, Italy

Filing date [22] should read as follows:

[22] Filed: March 12, 1980

Signed and Sealed this

Twenty-sixth Day of October 1982

[SEAL]

Attest:

Attesting Officer

GERALD J. MOSSINGHOFF

Commissioner of Patents and Trademarks